United States Patent [19]
Ohmura et al.

[11] Patent Number: 5,225,983
[45] Date of Patent: Jul. 6, 1993

[54] REAR WHEEL STEERING SYSTEM FOR MOTOR VEHICLE

[75] Inventors: Hiroshi Ohmura, Hatsukaichi; Takashi Nakashima, Hiroshima; Takeshi Edahiro, Hiroshima; Fumio Kageyama, Hiroshima; Atuo Tomoda, Hiroshima; Haruki Okazaki, Hiroshima; Ryuya Akita, Hiroshima; Takeshi Murai, Hatsukaichi, all of Japan

[73] Assignee: Mazda Motor Corp., Hiroshima, Japan

[21] Appl. No.: 631,924

[22] Filed: Dec. 20, 1990

[30] Foreign Application Priority Data

Dec. 21, 1989 [JP] Japan .................................. 1-331773
Mar. 13, 1990 [JP] Japan .................................. 2-62246

[51] Int. Cl.$^5$ .................................................. B62D 6/00
[52] U.S. Cl. ........................... 364/424.05; 364/426.02; 180/197; 180/140; 180/142
[58] Field of Search ............... 364/424.05, 426.02; 303/92, 96, 100; 180/197, 140, 141, 142, 79.1

[56] References Cited

U.S. PATENT DOCUMENTS

| | | | |
|---|---|---|---|
| 4,716,982 | 1/1988 | Ishii et al. | 364/424.05 |
| 4,941,095 | 7/1990 | Imaseki et al. | 364/424.05 |
| 4,967,859 | 11/1990 | Tomlinson | 364/424.05 |
| 4,967,865 | 11/1990 | Schindler | 364/424.05 |
| 4,971,174 | 11/1990 | Abe et al. | 180/140 |
| 4,998,593 | 3/1991 | Karnopp et al. | 364/426.02 |
| 5,058,018 | 10/1991 | Kuwana et al. | 364/426.02 |
| 5,089,967 | 2/1992 | Haseda et al. | 364/424.05 |

FOREIGN PATENT DOCUMENTS

3300640 7/1984 Fed. Rep. of Germany .

Primary Examiner—Gary Chin
Attorney, Agent, or Firm—Keck, Mahin & Cate

[57] ABSTRACT

A rear steering control system for a motor vehicle includes an antiskid braking system which controls a braking force in a brake device in a respective wheel in accordance with a deceleration condition of the respective wheel so as to prevent wheel locking in a braking operation. The sytem includes a rear steering control system for establishing a ratio of steering amount of the rear wheels to that of the front wheels as a predetermined steering ratio characteristic. An input device inputs an operation condition of the antiskid braking system and an control condition of the brake device for the respective wheel conducted by the antiskid braking system to the rear steering control system. A device is provided in the system for amending the predetermined steering ratio characteristic in accordance with the control condition of the brake device for the respective wheel when the antiskid braking system is in operation.

3 Claims, 9 Drawing Sheets

REAR WHEEL STEERING SYSTEM FOR MOTOR VEHICLE

BACKGROUND OF THE INVENTION

Field of the Invention

The present invention relates to a rear wheel steering system for a four-wheel steering vehicle, and in particular, to a rear wheel steering system which is capable of operating the motor vehicle safely when an antiskid braking system is operated.

Description of the Related Art

A rear wheel steering system for a four-wheel steering vehicle is disclosed in, for example, Japanese Patent Laid-Open No. 57-445688. Is provided so as to change a steering ratio of rear wheels against an angular steering amount of front wheels in accordance with a vehicle speed, an angular steering amount of front wheels or the like.

An antiskid braking system (hereinafter referred to as an ABS) is known which detects a slipping condition of each wheel by detecting a rotating speed of each wheel at the time of a braking operation. The system controls brake fluid pressure for the brake system of each wheel so as to obtain a maximum friction force between respective wheels and a road surface to prevent wheels from locking or skidding which may be caused by the rapid braking operation. In the rear wheel steering system for a motor vehicle with the ABS, there has been proposed a rear wheel steering system which changes a steering ratio of rear wheels in accordance with the operation or non-operation of the ABS so as to improve drivability at the time of a rapid braking operation. When the ABS is in operation, this rear wheel steering system changes equally under any condition predetermined steering ratio, characteristics of normal operation (non ABS operation), defined as a function of a vehicle speed or the like, into other steering ratio characteristics which are positioned toward the positive steering direction side area from the predetermined steering ratio characteristics of normal operation. Side slipping of the motor vehicle, which is caused by a rapid braking operation is prevented.

However, the friction coefficient of the road surface which contacts each wheel varies in accordance with the road surface conditions, and the condition for locking each wheel changes greatly in accordance with the center of gravity movement of the motor vehicle. Moreover, when the motor vehicle is running on a so called split road surface of which the friction coefficients of the right and left sides are different, steering the motor vehicle slightly during a braking operation causes big changes in its behavior. Furthermore, when the front wheels are locked, the motor vehicle is in an understeer condition, and when the rear wheels are locked, the motor vehicle is in an oversteer condition.

However, in the abovementioned conventional rear wheel steering system, when the ABS is working, a steering ratio characteristic of a normal operation changes equally under any condition into another steering ratio characteristic. Therefore, the conventional rear wheel steering system is not able to correspond to the abovementioned various steering conditions as is preferable when the ABS is operated.

SUMMARY OF THE INVENT

It is, therefore, an object of the invention to provide a rear steering control system for a four-wheel steering vehicle with an ABS for improving the stability of the motor vehicle when the ABS is operated.

It is another object of the invention to provide a rear steering control system for a four-wheel steering vehicle with an ABS for corresponding to changes of the vehicle at the time of a braking operation which are caused by a difference between the friction coefficents of the right and left road surfaces.

It is further another object of the invention to provide a rear steering control system for a four-wheel steering vehicle with the ABS for corresponding to changes of a steering characteristic of the vehicle at the time of a braking operation which are caused by a difference between the locking conditions of the front and rear wheels.

According to the invention, there is provided a rear steering control system for a motor vehicle, comprising an antiskid braking system which controls braking force in a brake device in a respective wheel in accordance with a deceleration condition of the respective wheel so as to prevent a wheel lock in a braking operation. The sytem includes, a rear steering control system for establishing a steering ratio of rear wheels to front wheels as predetermined steering ratio characteristics, means for inputting an operation condition of the antiskid braking system and a control condition of the brake device for the respective wheel conducted by the antiskid braking system to the rear steering control system, and means for amending the predetermined steering ratio characteristics in accordance with the control condition of the brake device for the respective wheel when the antiskid braking system is in an operation condition.

According to features of the invention, the rear steering control system amends the steering ratio characteristics of the rear wheels in accordance with an operation condition of the antiskid braking system and a control condition of the brake device for the respective wheel conducted by the antiskid braking system so that a control for a rapid braking opetation caused by an antiskid braking system and a control for steering rear wheels cooperate and stability of the motor vehicle in a rapid braking operation can be obtained.

The above and other objects and features of fhe present invention will be apparent from the following description by taking reference with accompanying drawings showing preferred embodiments of the present incvention.

DESCRIPTION OF THE PREFERRED EMBODIMENTS

Figure 1:
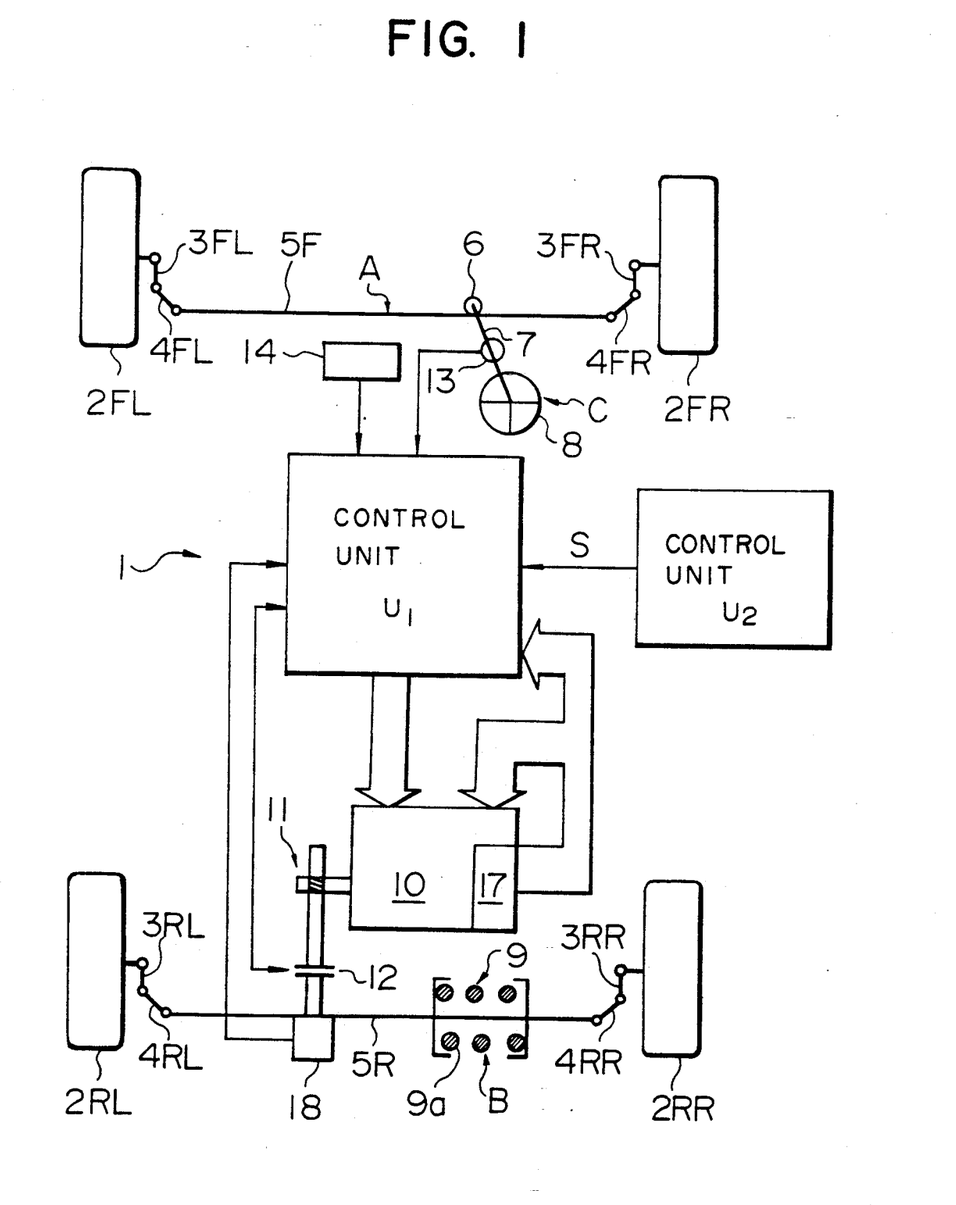
FIG. 1 is an overall schematic view of a rear steering system for a motor vehicle according to an embodiment of the invention.

FIG. 1 is an overall schematic view of a rear steering system for a motor vehicle according to an embodiment of the invention. In FIG. 1, numeral 1 designates a motor vehicle. The motor vehicle 1 has a front steering mechanism A for connecting right and left front wheels 2FR, 2FL, and a rear steering mechanism B for connecting right and left rear wheels 2RR, 2RL.

The front steering mechanism A includes a pair of knuckle arms 3FR, 3FL and tie rods 4FR, 4FL, and a rod 5F for connecting the tie rods 4FR, 4FL to each other. A rack and pinion type steering mechanism C with a rack (not shown) connected to the rod 5F and a pinion 6 connected to a steering shaft 7 is connected to the front steering mechanism A. The front steering mechanism A moves the rod 5F toward right and left hand sides in accordance with a steering amount of the steering wheel 8 to steer right and left front wheels 2FR, 2FL.

The rear steering mechanism B includes a pair of knuckle arms 3RR, 3RL and tie rods 4RR, 4RL, a rod 5R for connecting the tie rods 4FR, 4FL to each other, a servomotor 10 which is a driving source for steering right and left rear wheels 2RR, 2RL, and a connecting mechanism 11 for transferring a driving force of the servomotor 10 to the rod 5R. The rear steering mechanism B moves the rod 5R toward right and left hand sides through the connecting mechanism 11 by means of rotation in normal or reverse direction of the servomotor 10 to steer right and left rear wheels 2RR, 2RL.

The rear steering mechanism B further includes a fail-safe mechanism which comprises a clutch 12 which is provided in the connecting mechanism 11 to release connection between the servomotor 10 and the rod 5R, and a neutral position maintaining device 9 which is provided between the rod 5R and a vehicle body, and has a spring 9a biasing constantly the rod 5R to the neutral position. When the motor vehicle 1 is in a fail condition, such as when the servomotor 10 is in trouble, the fail-safe mechanism releases the clutch 12 and maintains the rod 5R at the neutral position by the neutral position maintaining device 9, so that the motor vehicle is operated as a two-wheel steering (2WS) vehicle.

The motor vehicle 1 is further provided with a steering sensor 13 for detecting an angular steering amount of the steering wheel 8, a vehicle-speed sensor 14 for detecting a vehicle speed, an encoder 17 for detecting a rotating position of the servomotor 10, and a rear steering sensor 18 for detecting a displacement amount of the rod 5R.

The motor vehicle 1 is still further provided with a control unit $U_1$ to which the detected amounts of the steering sensor 13, the vehicle-speed sensor 14, the encoder 17, and the rear steering sensor 18 are input, and which control the rotation of the servomotor 10 in accordance with the detected amounts. The control unit $U_1$ includes a vehicle-speed responsive type rear steering control system which establishes predetermined steering ratio characteristics of the rear wheels 2RR, 2RL as a function of the vehicle-speed detected by the vehicle-speed sensor 14, and further establishes a desired angular steering amount of the rear wheels 2RR, 2RL in accordance with both the established steering ratio and the detected angular steering amount of the steering wheel 8. Based on the desired angular steering amount of the rear wheels, the control unit $U_1$ actuates the servomotor 10, and steers the rear wheels 2RR, 2RL, while the rear steering control system is checking the rotating position of the servomotor 10 and the displacement position of the rod 5R.

Figure 2:
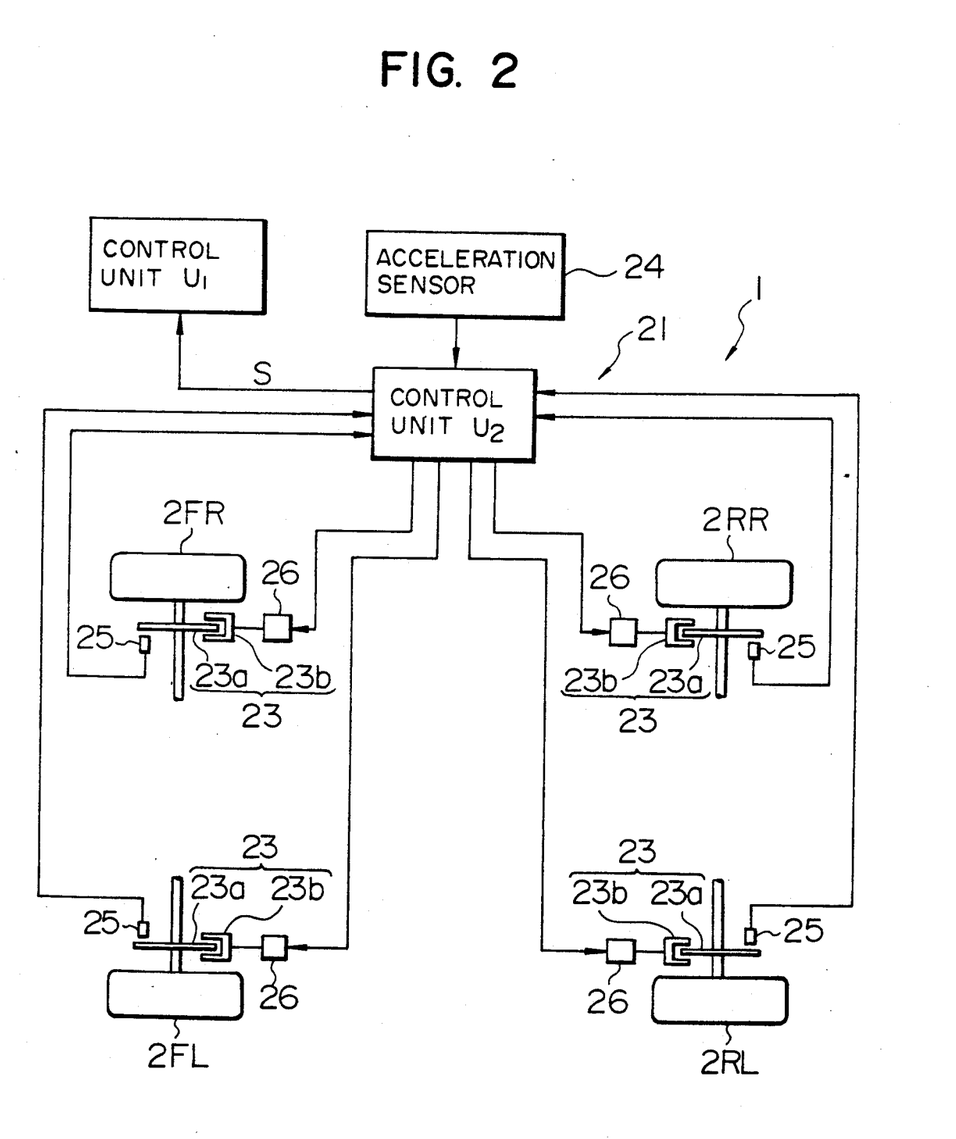
FIG. 2 is is an overall schematic view of an antiskid braking system (ABS) provided in the motor vehicle 1 in FIG. 1.

FIG. 2 is an overall schematic view of an antiskid braking system (ABS) provided in the motor vehicle 1 in FIG. 1. As shown in FIG. 2, the right and left front wheels 2FR, 2FL and the rear wheels 2RR, 2RL are provided with a brake device 23 respectively, each of which includes a disc rotor 23a rotating together with each wheel 2FR, 2FL, 2RR and 2RL, and a caliper 23b for braking the rotation of the disc rotor 23a when hydraulic pressure for braking is supplied thereto.

The motor vehicle 1 has ABS which adjusts the hydraulic pressure in each brake device 23 independently. ABS includes an acceleration sensor 24 for detecting a decreasing speed of the motor vehicle 1, a wheel rotating speed sensor 25 for detecting a wheel rotating speed of each wheel 2FR, 2FL, 2RR and 2RL, a control unit $U_2$ to which the detected amounts of these sensors 24, 25, are input, a hydraulic pressure control valve 26 which adjusts the hydraulic pressure in each brake device 23 by the control signals output from the control unit $U_2$, and a hydraulic pressure unit (not shown in FIG. 2) supplying pressurized brake fluid to the valve 26.

The control unit $U_2$ establishes a reference wheel rotating speed $V_{ref}$, based on such factors as the lowest wheel rotating speed among the wheel rotating speeds $W_{FR}$, $W_{FL}$, $W_{RR}$ and $W_{RL}$, of each wheel 2FR, 2FL, 2RR and 2RL so that an optimum braking force is generated, and controls the hydraulic pressure which is supplied to each wheel by the valve 26, after comparing the wheel rotating speed of each wheel with the reference wheel rotating speed $V_{ref}$, so as to prevent each wheel from skidding or locking.

The control unit $U_2$ further includes a split control system. When the motor vehicle 1 is running on the split road surface having friction coefficients $\mu$ in the right and left side area of the road which are different each other, the split control system controls the hydraulic pressure which is supplied to each brake device 23 so as to obtain an optimum braking distance, based on a value of the hydraulic pressure in each brake device 23 detected by the hydraulic pressure sensor (not shown).

As shown in FIG. 1 and FIG. 2, a signal S showing the operation condition and control condition of the ABS is input from the control unit $U_2$ to the control unit $U_1$. The control unit $U_1$ changes the steering ratio characteristics of the rear wheels 2RR, 2RL, against the front wheels 2FR, 2FL in accordance with the operation condition and control condition of the ABS in each brake device 23.

Figure 3:
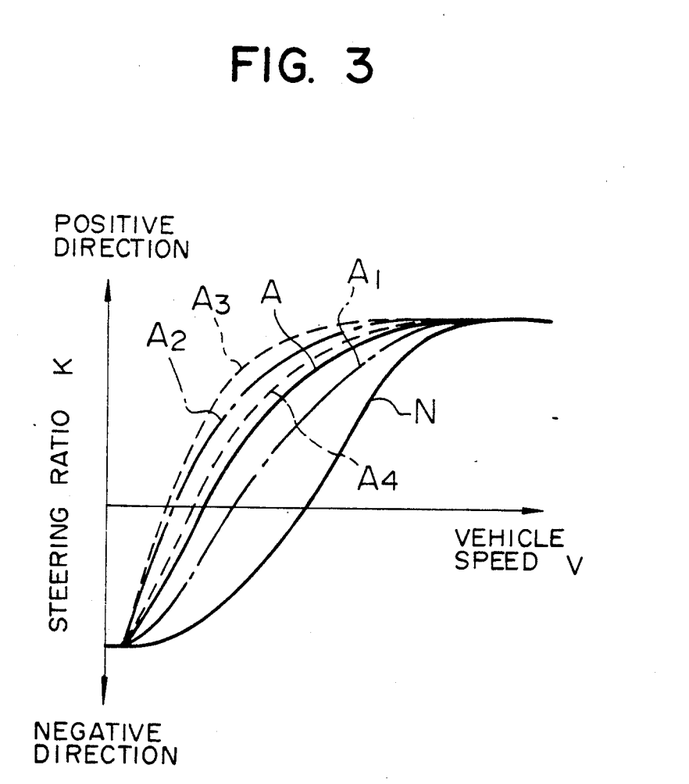
FIG. 3 is a graphical representation showing a relationship between a steering ratio and a vehicle speed.
Figure 4:
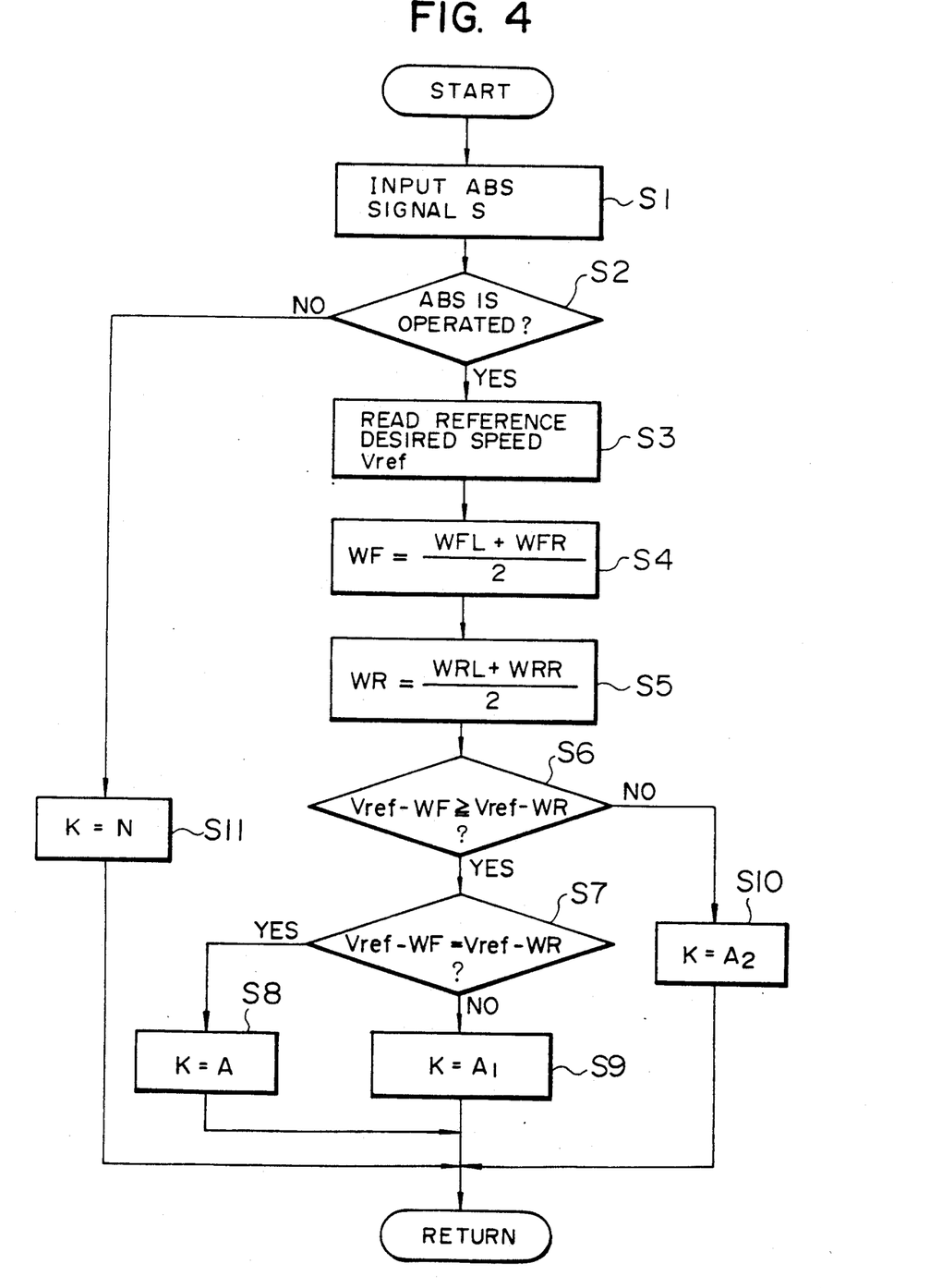
FIG. 4 is a flow chart of the control carried out by the control unit of the invention when the locking condition of the rear wheels are different from that of the front wheels.
Figure 5:
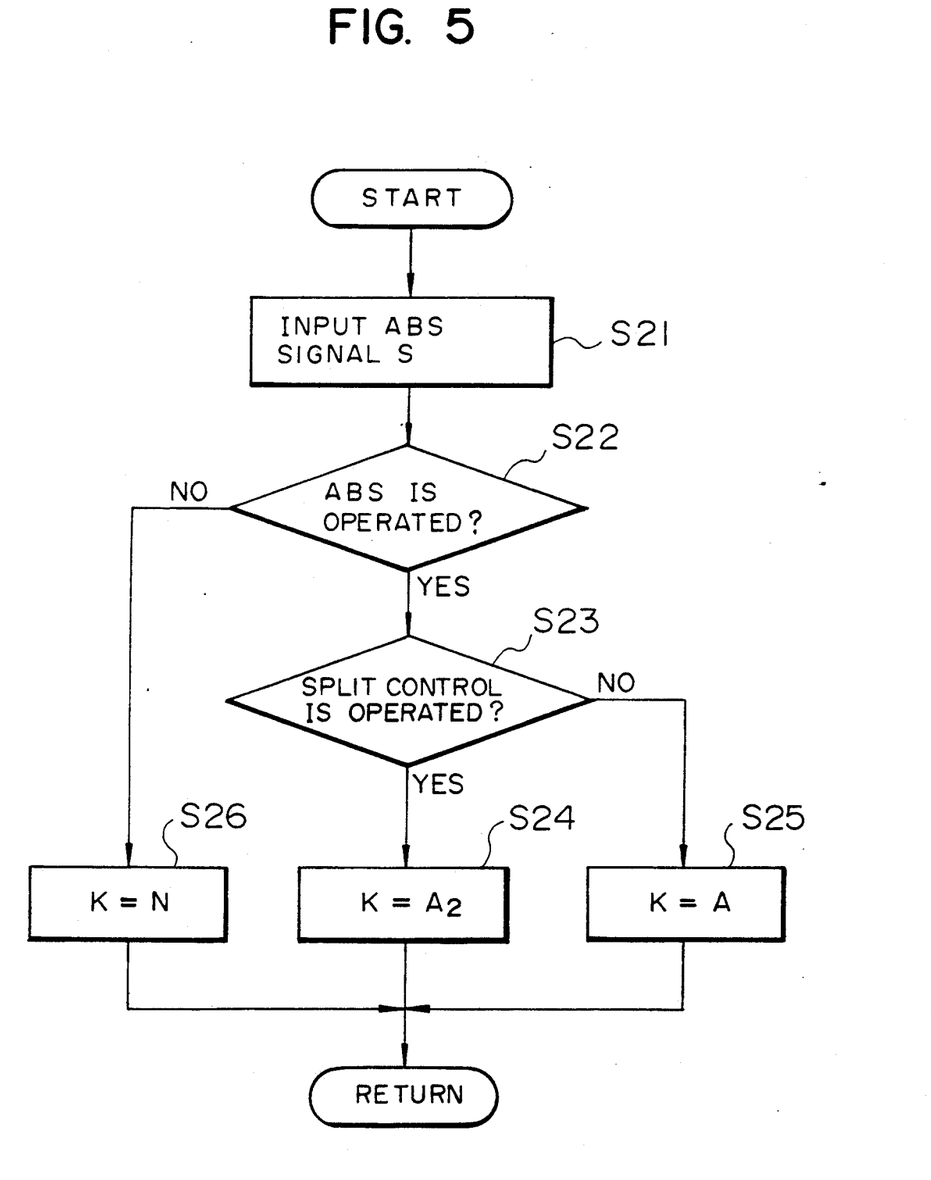
FIG. 5 is a flow chart of the control carried out by the control unit of the invention when ABS is operated.

FIG. 3 is a graphical representation showing a relationship between a steering ratio and a vehicle speed. Here a steering ratio is defined as a ratio of the angular steering amount of the rear wheels to that of the front wheels. In FIG. 3, a plurality of steering ratio characteristics established by the control unit $U_1$ in the rear steering control system are illustrated. FIG. 4 is a flow chart of the control carried out by the control unit $U_1$ of the invention when the locking condition of the rear wheels 2RR, 2RL is different from that of the front wheels 2FR, 2FL. FIG. 5 is a flow chart of the control carried out by the control unit $U_1$ of the invention when ABS is operated.

As shown in FIG. 3, the rear steering control system has a plurality of steering ratio characteristics N, A, $A_1$, $A_2$, $A_3$ and $A_4$. N represents the normal steering ratio characteristic which is established in the non ABS operation. A represents the steering ratio characteristic which is established when the ABS is in a normal operation. $A_1$ represents the steering ratio characteristic which is established in the ABS operation and the front wheels 2FR, 2FL being locked. $A_2$ represents the steering ratio characteristic which is established in the ABS operation and the rear wheels 2RR, 2RL being locked, or in the ABS split control operation. $A_3$ and $A_4$ will be described hereinafter.

Since the motor vehicle 1 is considered to be in the rapid braking condition when the ABS is operated, the steering ratio characteristic A is established in the positive direction side area from the steering ratio characteristic N so that the drivability for steering operation is restrained and the stability of the vehicle in the rapid braking operation can be improved.

Since the motor vehicle 1 is in an understeer condition when operated when the ABS is operated and the front wheels 2FR, 2FL are locked, the steering ratio characteristic $A_1$ is established in the negative direction side area slightly from the steering ratio characteristic A so that the drivability for steering operation can be improved.

The motor vehicle 1 is in a oversteer condition when the ABS is operated and and the rear wheels 2RR, 2RL are locked. The motor vehicle 1 causes a big change of behavior thereof by even a slight steering opetation when the ABS is operated in the split control operation. Therefore, in both conditions, the steering ratio characteristic $A_2$ is established in the positive direction side area further relative to the steering ratio characteristic A so that the drivability for steering operation is restrained and the stability of the vehicle can be improved.

Referring to FIG. 4 and FIG. 5, the flow chart which represents how the steering ratio characteristics N, A, A and $A_2$ are established by the control unit $U_1$ will be described.

Now, referring to FIG. 4, a signal S representing the ABS operation condition and control condition in the control unit $U_2$ is input to the control unit $U_1$ (S 1). When the ABS is operated, the control unit $U_1$ reads the reference desired speed $V_{ref}$ and respective rotating speed $W_{FR}$, $W_{FL}$, $W_{RR}$, $W_{RL}$ of the wheels 2FR, 2FL, 2RR, 2RL, and computes the average speed $W_F$ of the rotating speed $W_{FR}$, $W_{FL}$ of the front wheels and the average speed $W_R$ of the rotating speed $W_{RR}$, $W_{RL}$ of the rear wheels (S2, S3, S4, S5). Next, when the deceleration ($V_{ref}-W_F$) of the front wheels is substantially equal to the deceleration ($V_{ref}-W_R$) of the rear wheels, the steering ratio characteristic N is changed into the steering ratio characteristics A (S7, S8). Since the steering ratio of the rear wheels 2RR, 2RL is established in the positive direction side area from the steering ratio characteristic N, the drivability for steering operation is restrained and the stability of the vehicle can be improved.

When the deceleration ($V_{ref}-W_F$) of the front wheels is more than the deceleration ($V_{ref}-W_R$) of the rear wheels, in other words, when the front wheels 2FR, 2FL are in the rapid lock condition, the steering ratio characteristic N is changed into the steering ratio characteristic $A_1$ (S6, S7, S9). Namely, the steering ratio of the rear wheels 2RR, 2RL is established in the positive direction side area from the steering ratio characteristics N, and in the negative direction side area slightly from the steering ratio characteristic A in which the front and rear wheels are in substantially same lock condition. Consequently the drivability for steering operation can be improved even more with high stability of the vehicle in the rapid braking operation and the understeer condition is preferably canceled.

When the deceleration ($V_{ref}-W_F$) of the front wheels is less than the deceleration ($V_{ref}-W_R$) of the rear wheels, in other words, when the rear wheels 2RR, 2RL are in rapid lock condition, the steering ratio characteristic N is changed to the steering ratio characteristic $A_2$ (S6, S10). Namely, the steering ratio of the rear wheels 2RR, 2RL is established in the positive direction side area further relative to the steering ratio characteristic A in which the front and rear wheels are in substantially same lock condition. Consequently the drivability is more restrained and therefore the oversteer is preferably canceled.

Now, referring to FIG. 5, the abovementioned signal S in the control unit $U_2$ is input to the control unit $U_1$ (S21). when the ABS is operated in the split control opetation, the control unit $U_1$ changes the steering ratio characteristic N into the steering ratio characteristic $A_2$ of the split control operation (S21, S22, S23, S24). Since the steering ratio of the rear wheels 2RR, 2RL is established in the positive direction side area further from the steering ratio characteristic A, the drivability is more restrained and, therefore, a large change in behavior of the vehicle 1 caused by the steering opetation becomes small, and the stability of the vehicle 1 in the ABS split control operation can be improved.

As explained above, in accordance with this embodiment of the invention, the rear steering control system is operated so that the steering ratio characteristic of the rear wheels can be changed in accordance with the signal S representing the ABS operation condition and control condition of the respective wheel 2FR, 2FL, 2RR, 2RL. So that the control by the ABS in the rapid braking operation and the rear wheel steering control by the rear steering control system are co-operated, and the stability of the motor vehicle in rapid braking operation can be improved.

When the ABS is operated, the rear steering control system is operated so that the steering ratio characteristic A in which the front and rear wheels are in substantially equal lock condition is amended or changed into the characteristic $A_1$ when the front wheels are in the rapid braking condition, or into the characteristic $A_2$ when the rear wheels are in the rapid braking condition. Therefore, the changes in the steering characteristic of the vehicle 1 caused by the rapid braking operation is restrained, and the controllability of the vehicle 1 can be improved.

When the ABS is operated in the split control operation, the rear steering control system is operated so that the steering ratio characteristic A is amended or changed into the characteristic $A_2$. Therefore, when the motor vehicle 1, which is running on the split road surface, is braked rapidly, the change in behavior of the motor vehicle is restrained, and the stability of the motor vehicle 1 can be improved.

In the embodiment described, various modifications may be made. For example, the steering ratio characteristic $A_2$ may be establised both in the rear wheel rapid lock condition and in the split control operation. However, the characteristic establised in the rear wheel rapid lock condition may be different from that in the split control operation. In this case, the steering ratio characteristic in the split control operation is establised in the positive direction side area relative to that in the rear wheel rapid lock condition.

Next, refering to FIG. 3 and FIG. 6 through FIG. 9, another embodiment of the rear steering control system of the invention will be described.

In accordance with this embodiment, the rear steering control system amends the steering ratio characteristic A in which the ABS is operating into a steering ratio characteristic $A_3$ or $A_4$ shown in FIG. 3. $A_3$ represents the steering ratio characteristic which is established when the steering wheel is steered toward a high friction coefficient side area of the road surface. The steering ratio characteristic $A_3$ is positioned in a positive direction side area from the steering ratio characteristic $A_2$. $A_4$ represent the steering ratio characteristic which is established when the steering wheel is steered toward a low friction coefficient side area of the road surface. The steering ratio characteristic $A_4$ is positioned in a negative direction side area relative to the steering ratio characteristic $A_2$ and in a positive direction side area relative to the steering ratio characteristic A in which the ABS is in operation.

Figure 6:
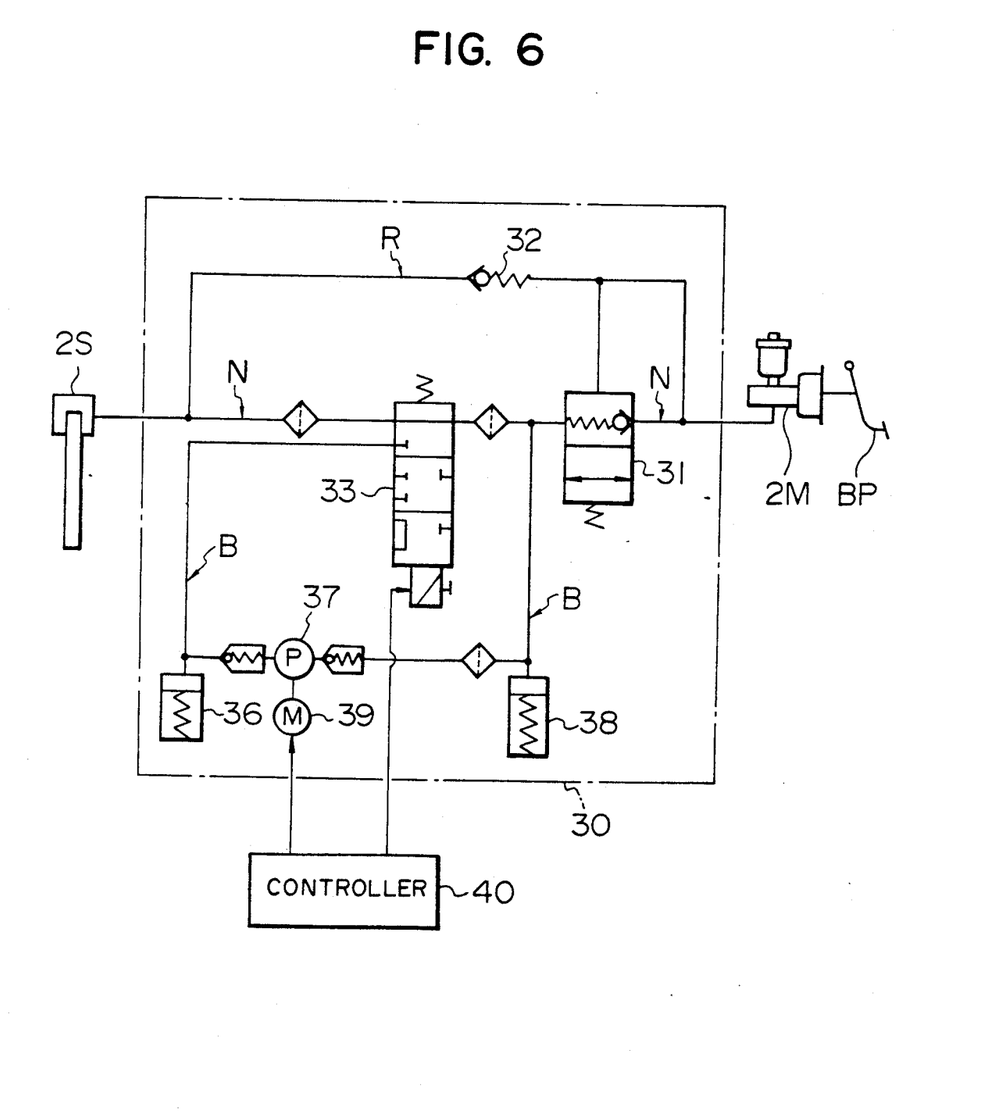
FIG. 6 is a hydraulic pressure circuit diagram of a hydraulic unit which is used in the braking device of the ABS.

FIG. 6 is a hydraulic pressure circuit diagram of a hydraulic unit which is used in the braking device of the ABS. In FIG. 6, numeral 30 designates hydraulic unit. The hydraulic unit 30 includes a normal path N, a ABS-path B, and a return path R. Those paths are provided with a F-valve 31, a check valve 32, a magnet valve 33, a reservoir 36, a pump 37, an accumulator 38 and a motor 39. The hydraulic unit 30 is provided in each wheel.

The normal path N connects a master cylinder 2M to a wheel cylinder 2S (which corresponds to the caliper 23b in FIG. 2) through the F-valve 31 and the magnet valve 33 in series.

The ABS-path B branches off from a point of the normal path N between the the F-valve 31 and the magnet valve 33, and is connected to the magnet valve 33 through the accumulator 38, the pump 37 and the reservoir 36.

The return path R connects the master cylinder 2M to the wheel cylinder 2S through the check valve 32 so as to return the brake fluid from the wheel cylinder 2S to the master cylinder 2M when the braking operation is released.

The F-valve 31 provided in the normal path N not only leads the the brake fluid pressure in the master cylinder 2M to the magnet valve 33 but also works as a check valve so as to prevent the brake fluid from flowing in the reverse direction and to permit it to do so under a pressure which is less than predtermined value.

The magnet valve 33 has three ports, and switches them in accordance with a command (a control current) from a controller 40. The magnet valve 33 switches the normal path N to/from the ABS-path B, or shuts off them both.

When operated in the normal braking operation, the magnet valve 33 is positioned in the normal path N. The brake fluid pressure generated in the master cylinder 2M by the operation of the brake pedal BP flows to the wheel cylinder 2S so as to operate the brake device. The brake fluid returns to the master cylinder 2M through the return path R.

When the ABS is operated, the magnet valve 33 is switched to the ABS-path B so that the brake fluid pressure supplied to the wheel cylinder 2S is changed into three conditions such as reducing, maintaining and raising conditions. Namely, when the magnet valve 33 shuts off the the normal path N and then communicates the ABS-path B, the brake fluid pressure in the wheel cylinder 2S is returned to the the reservoir 36 so that the pressure thereof is reduced. When the magnet valve 33 shuts off both the the normal path N and the ABS-path B, the brake fluid pressure in the wheel cylinder 2S is maintained at a predetermined constant value. When the magnet valve 33 is switched to the normal path N, the brake pressure accumulated in the accumulator 38 is applied to the the wheel cylinder 2S so that the brake fluid pressure in the wheel cylinder 2S is raised. When the pressure in in the accumulator 38 is reduced, the brake fluid is supplied to the the accumulator 38 through the pump 37 actuated by the motor 39.

Figure 7:
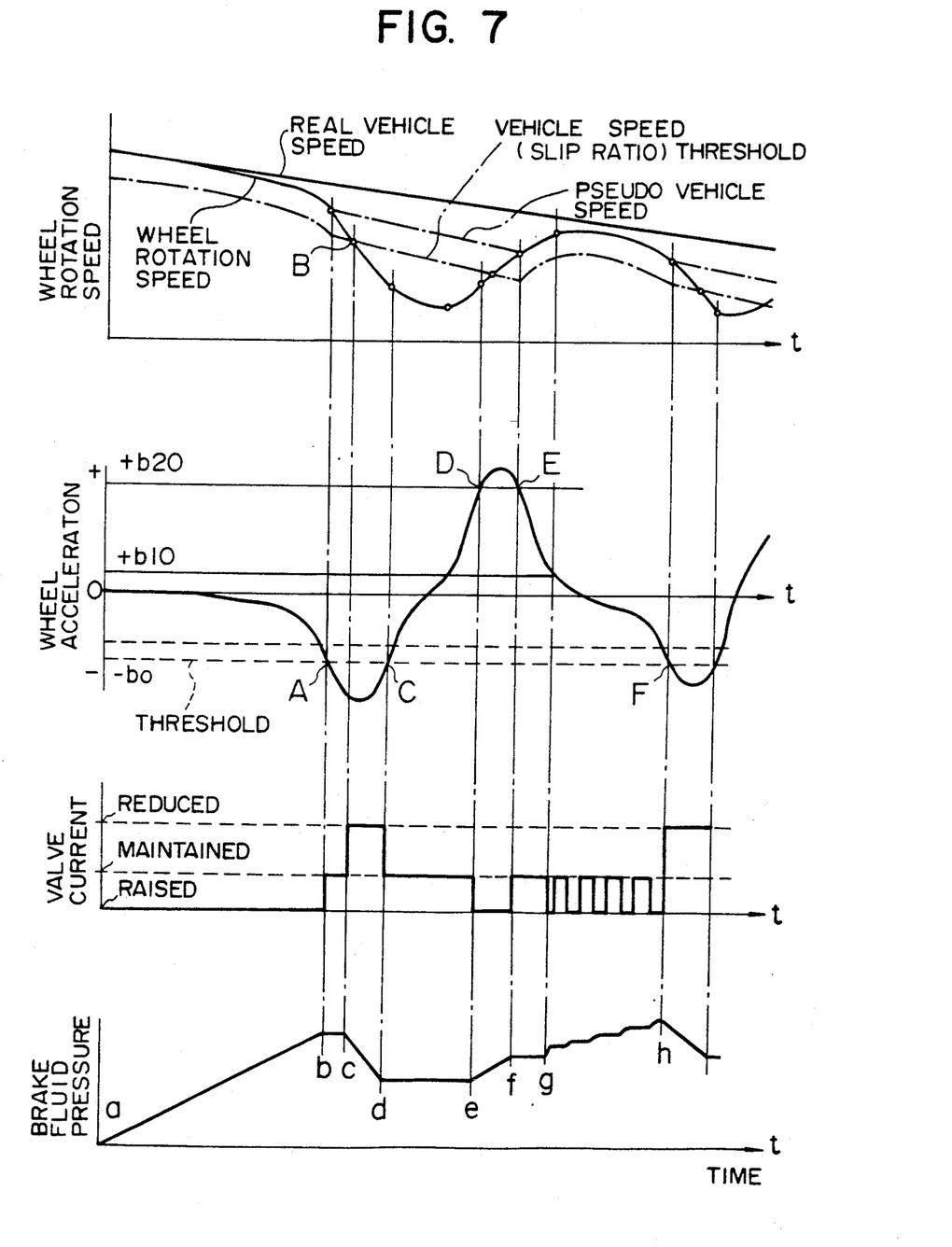
FIG. 7 is a graphical representation showing relationships between respective the wheel rotation speed, the wheel acceleration, the valve current and the brake fluid pressure, and the time in the ABS operation carried out by the control unit.

FIG. 7 is a graphical representation showing relationships between respective the wheel rotation speed, the wheel acceleration, the valve current and the brake fluid pressure, and the time in the ABS operation carried out by the control unit $U_2$. Referring to FIG. 7, an ABS oparation starting threshold $S_1$ of the wheel slip ratio and an ABS operation starting threshold $\alpha_1$ of the wheel acceleration are provided independently. When either the wheel slip ratio or the wheel acceleration reaches to the respective ABS operation starting threshold, the ABS operation is started. The alternate long and short dash line in FIG. 7 represents a vehicle speed (an ABS operation starting vehicle speed) when the pseudo vehicle speed is reduced with the wheel slip ratio $S_1$ of the ABS operation starting threshold. When the wheel rotation speed is less than the vehicle speed, the slip ratio S is more than the an ABS oparation starting threshold $S_1$. The broken line represents the ABS operation starting threshold $\alpha_1(=-b_0)$ of the wheel acceleration.

The brake pedal BP is operated, the brake fluid pressure applied to the wheel cylinder 2S is increased for operating the brake device so that the wheel rotation speed is reduced, and the differece between the the wheel rotation speed and the vehicle speed increases (between a-b).

When the wheel acceleration (minus acceleration) goes down below the ABS operation starting threshold $-b_0$ at A, the magnet valve 33 is switched to the maintaining position to maintain the brake fluid pressure (between b-c).

When the differece between the wheel rotation speed and the vehicle speed increases and the wheel rotation speed is less than the ABS operation starting vehicle speed (less than predetermined slip ratio S) at B, it is judged that the wheels are in the locking condition, and, therefore, the magnet valve 33 is switched to the reducing pressure position to reduce the pressure in the the wheel cylinder 2S. Consequently the braking operation is reduced (between c-d).

After the braking operation is reduced, the wheel acceleration reaches to the ABS operation starting threshold $-b_0$ at C. Then the magnet valve 33 is again switched to the maintaining position to maintain the brake fluid pressure (between d-e).

While maintaining the brake fluid pressure, when the wheel rotation speed recovers and, increases and further, the wheel acceleration is more than a preset value $+b_{20}$ at D, it is judged that the wheel rotation speed has recovered fully, and the magnet valve 33 is switched to the raising pressure position to raise the pressure in the the wheel cylinder 2S (between e-f).

After the brake fluid pressure is raised, the wheel acceleration goes down to the preset value $+b_{20}$ at E. Then the magnet valve 33 is again switched to the maintaining position to maintain the brake fluid pressure (between f-g).

While the the wheel acceleration goes down between preset value $+b_{10}$ and the ABS operation starting threshold $-b_0$, the magnet valve 33 is switched so as to repeat the raising pressure position and the maintaining position (between g-h).

When the the wheel acceleration goes down below the ABS operation starting threshold $-b_0$ at F, the abovementioned cycle is repeated.

By using the ABS operation mentioned above, the wheels of the vehicle rotate on the road surface under a condition in which the biggest braking force is obtained.

Figure 8:
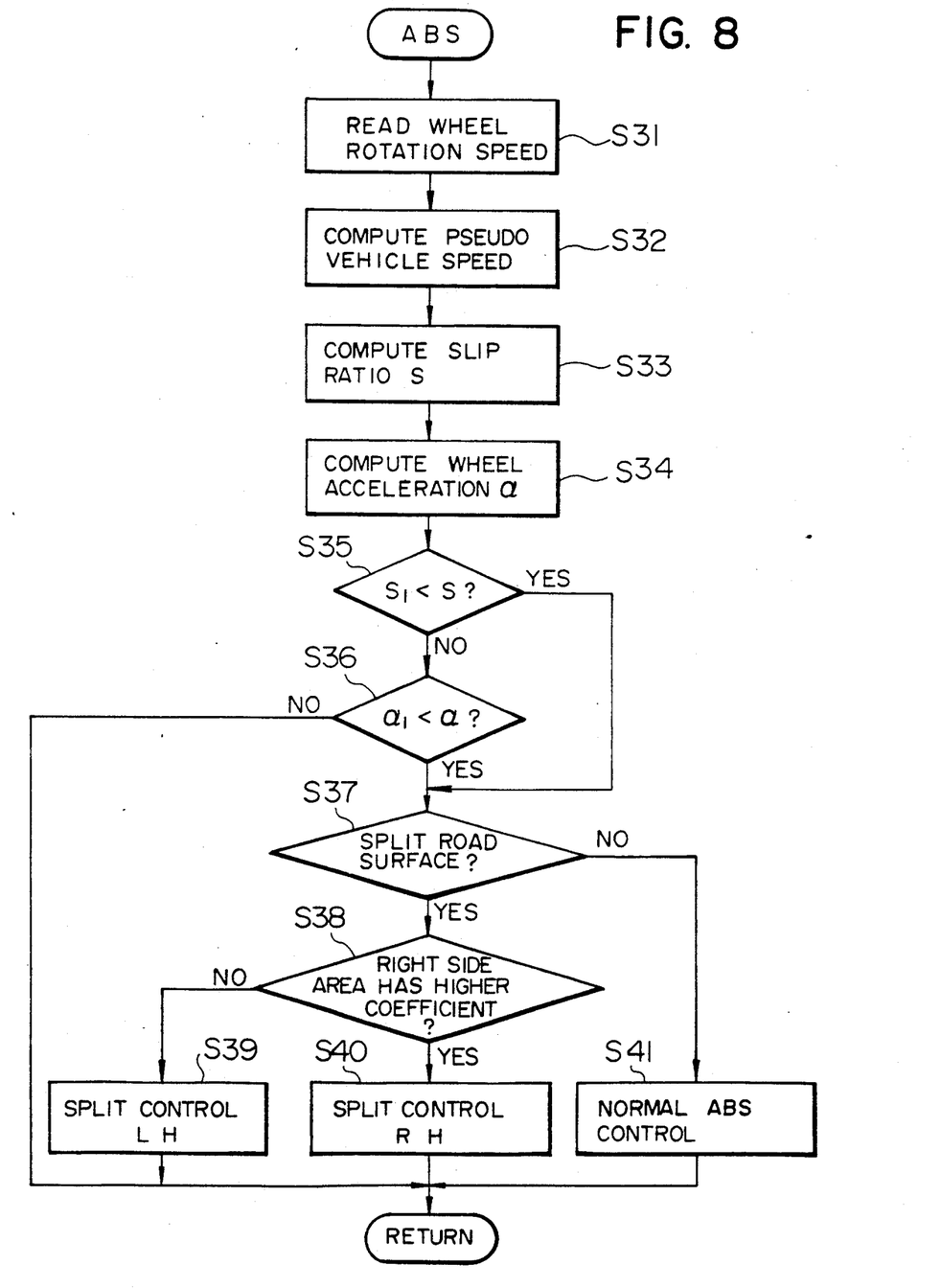
FIG. 8 is a flow chart of the ABS control operation carried out by the control unit in accordance with another embodiment of the invention.

FIG. 8 is a flow chart of the ABS control operation carried out by the control unit $U_2$ in accordance with another embodiment of the invention. Referring to FIG. 8, the wheel rotation speed of a respective wheel and the vehicle speed are assumed in accordance with the value detected by the wheel rotating speed sensor 25 (shown in FIG. 2), and a slip ratio S and an acceleration $\alpha$ of respective wheel are computed (S31, S32, S33 and S34). Next, the slip ratio S and acceleration $\alpha$ of respective wheel are compared with the ABS operation starting threshold $S_i$ and $\alpha_1$ thereof (S35 and S36). When either one is more than the ABS oparation starting threshold $S_1$ or $\alpha_1$, the operation goes to the next step in which it is judged whether or not the road surface is split and which side area of the road surface has higher friction coefficient (S37). When the the left side area of the road surface has higher friction coefficient (LH), the step goes to S39 in which the split control is operated with a desired slip ratio. When the right side area of the road surface has a higher friction coefficient (RH), the step goes to S40, in which the split control is operated with the other desired slip ratio. When the the road surface is not split, the step goes to S41, in which the normal ABS control operation is operated. The split road information is input to the control unit $U_1$.

Figure 9:
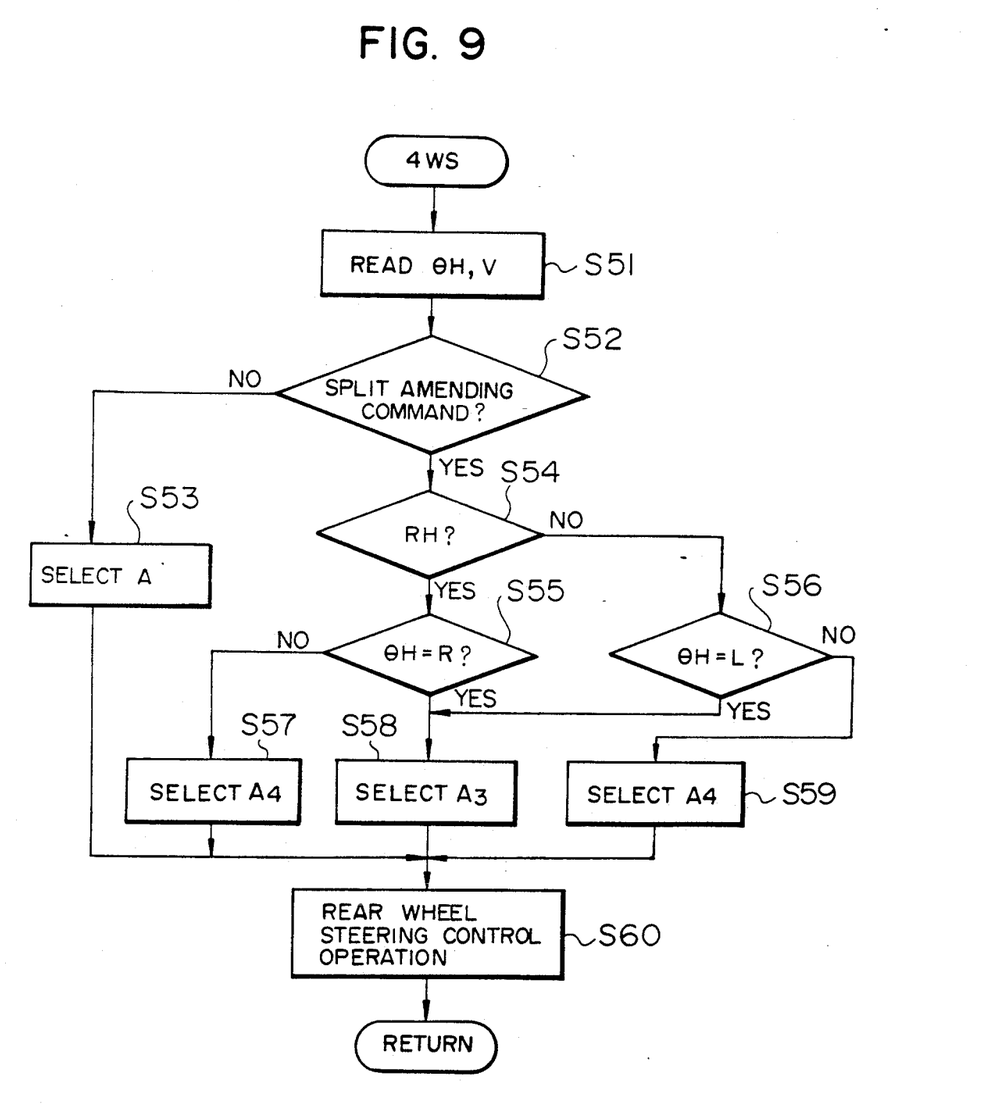
FIG. 9 is a flow chart of the four-wheel steering (4WS) control carried out by the control unit in accordance with another embodiment of the invention.

FIG. 9 is a flow chart of the four-wheel steering (4WS) control carried out by the control unit $U_1$ in accordance another embodiment of the invention. Referring to FIG. 9, the vehicle speed V and the angular steering amount $\theta H$ are read (or the angular steering speed is possible) in S51. Next, it is judged whether or not there is a split amending command in accordance with abovementioned split road information in S52. When there is no split amending command, the steering ratio characteristic A of the normal ABS control operation is selected in S53. When there is split amending command, the operation goes to S54, S55 and S56. In S54, S55 and S56, the steering ratio characteristic $A_3$ or $A_4$ is selected in accordance with which side area has a higher friction coefficient and steering directions. When steered toward the higher friction coefficient side area, the steering ratio characteristic $A_3$ is selected in S58. When steered toward the lower friction coefficient side area, the steering ratio characteristic $A_4$ is selected in S57 and S59.

Namely, when steered toward the higher friction coefficient side area, the steering ratio characteristic $A_3$ is selected. The characteristic $A_3$ is positioned in a positive direction side area relative to the the characteristic A of the normal ABS control operation. Consequently the motor vehicle is able to obtain a stable cornering operation with a large cornering force. On the other hand, when steered toward the lower friction coefficient side area, the steering ratio characteristic $A_3$ is selected the characteristic $A_4$ is positioned in a negative direction side area relative to the characteristic $A_2$. Consequently, the motor vehicle is able to obtain a rapid cornering operation. Also since steering outer wheels are positioned in the higher friction coefficient side area, the motor vehicle is further able to obtain a stable cornering operation.

The invention has been described with reference to the preferred embodiments thereof, which are intended to be illustrative rather than limiting, various changes and modifications may be made without departing from the spirit and scope of the invention as defined in the following claims.

What is claimed is:

1. A steering control system for a motor vehicle, including an antiskid braking system which controls a braking force in a brake device for a respective wheel in accordance with a deceleration condition of the respective wheel so as to prevent wheel locking in a braking operation, the system comprising:

a rear steering control system for establishing a ratio of a steering amount of the rear wheels to a steering amount of the front wheels as a predetermined steering ratio characteristic;

means for inputting signals representing an operation condition of the antiskid braking system and a control condition of the brake device for the respective wheel conducted by the antiskid braking system to the rear steering control system;

means for amending the predetermined steering ratio characteristic to a second steering ratio characteristic in accordance with the control condition of the brake device for the respective wheel when the antiskid braking system is in operation; and means for sensing respective lock conditions of respective front and rear wheels;

wherein said means for amending the predetermined steering ratio characteristic amends the predetermined steering ratio characteristic to a third steering ratio characteristic which is positioned in a positive steering direction area relative to the predetermined steering ratio characteristic when said respective lock conditions of the respective front and rear wheels are substantially equal to each other, (b) the predetermined steering ratio characteristic to a fourth steering ratio characteristic which is positioned in said positive steering direction area relative to the predetermined steering ratio characteristic and in a negative steering direction area relative to the third steering ratio characteristic when the front wheels are locked earlier than the rear wheels, and (c) the predetermined steering ratio characteristic to a fifth steering ratio characteristic which is positioned in said positive steering direction area further from the third steering ratio characteristic when the rear wheels are locked earlier than the front wheels.

2. A rear steering control system in accordance with claim 1 in which said antiskid braking system controls the brake device in both the front and rear wheels independently.

3. A rear steering control system in accordance with claim 1 in which said rear steering control system is responsive to vehicle speed for establishing said predetermined steering ratio characteristic.

* * * * *